No. 617,192. Patented Jan. 3, 1899.
F. W. SCHNEIDER.
ELECTRIC PROPULSION OF VEHICLES.
(Application filed Dec. 10, 1897.)
(No Model.)
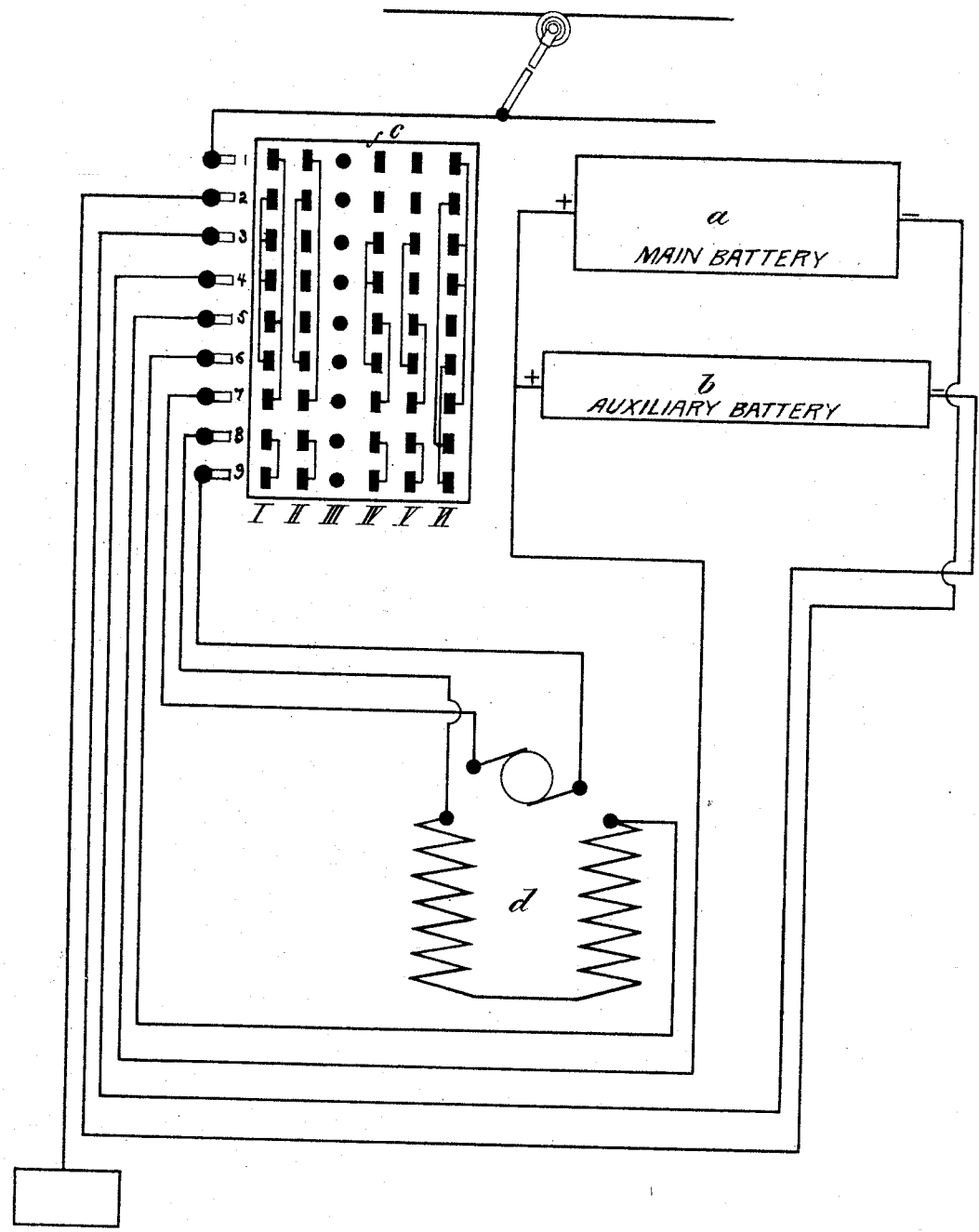
Witnesses
John Lotta
Julius ...
Inventor
F. W. Schneider
per
Attorneys

UNITED STATES PATENT OFFICE.

FRIEDRICH WILHELM SCHNEIDER, OF TRIBERG, GERMANY, ASSIGNOR TO THE ELECTRICITÄTS-GESELLSCHAFT TRIBERG, OF SAME PLACE.

ELECTRIC PROPULSION OF VEHICLES.

SPECIFICATION forming part of Letters Patent No. 617,192, dated January 3, 1899.

Application filed December 10, 1897. Serial No. 661,374. (No model.)

*To all whom it may concern:*

Be it known that I, FRIEDRICH WILHELM SCHNEIDER, a subject of the Grand Duke of Baden, and a resident of Triberg, Baden, Germany, have invented new and useful Improvements Relating to the Electric Propulsion of Vehicles, (applications for patents for which have been filed in Germany December 24, 1896, in France July 31, 1897, in Austria October 15, 1897, in Hungary October 15, 1897, in Begium October 15, 1897, and in Great Britain October 15, 1897,) of which the following is a full, clear, and exact description.

Both in the working of electric vehicles by accumulators alone and also in the mixed system of accumulators and current-supplying conductors the batteries when starting were mostly arranged in parallel in multiple groups in order to preserve the cells and not to diminish their efficiency. It is a well-known fact that the successive connecting up of such groups in tension is accompanied by shock or jerk, which is not agreeable to the passengers and has an injurious effect on the motor. For these reasons the successive insertion of multiple groups in the circuit has already been abandoned in the working with accumulators alone, and a single group is used, with which the circuit-switch can be constructed in a simpler and easier manner; but the current discharge when starting is still too high, and also the jerk is not entirely avoided. In the mixed system there has therefore been used only a battery of which all the elements are connected in tension, avoiding these inconveniences. While the vehicle is taking current from the conductor, the motor is supplied directly from the conductor and the battery is charged in parallel with the motor. With this method there is only the one disadvantage that when starting on parts of the line not provided with the conductors the current discharge rises to five or ten times the normal rate, whereby the capacity and the efficiency of the battery are considerably impaired and the cells are more liable to injury. It is the purpose of this invention to avoid these defects, while keeping to the simple method of connecting.

In this invention there are used a main battery and an auxiliary battery. The first battery is of such a strength that it can provide the working power with a normal current discharge for the desired time and that it can also be charged in a predetermined period. The auxiliary battery is composed of very small elements, preferably of the Planté type, with extremely large surface, and when it is being charged it is put in circuit parallel to the main battery. As the auxiliary battery is charged in a very short time, its counter tension soon augments, so that the whole charging-current goes into the main battery. When starting, this auxiliary battery is put in circuit also parallel to the main battery, and as its tension is somewhat higher than that of the main battery it provides the great current quantity to be delivered suddenly when starting. After the start the auxiliary battery is put out of circuit and can again recover until the next start. The auxiliary battery has as long a period of discharge as the main battery, since it has to supply an exceptionally large amount of current only for short periods. If, for instance, the main battery when starting had to give in the first minute one hundred and twenty amperes, the energy expended by it is greater than if the battery has to give for five minutes a normal current discharge of fifteen to twenty amperes per minute; but if when starting the auxiliary battery, which is constructed in the present case for a high current discharge, is put in circuit parallel with the main battery eighty to ninety amperes are delivered by the auxiliary battery and the main battery has hardly to give more than its normal quantity. The main battery, which in the first case would work for one-half hour, will be sufficient in the other case for one and one-half to two hours. It is thus evident that the present arrangement of putting an auxiliary battery into circuit makes the working very economical.

The following example will explain the preceding statements, reference being had to the annexed diagram:

The main battery $a$ is, for instance, one of eighty ampere-hours, with thirty amperes of normal discharge power and having a weight of about fifteen hundred kilograms. The auxiliary battery $b$ is such that with a tenfold increase of current at each start it can discharge at the rate of sixty amperes for ten to twelve ampere-hours and weighs about three hundred kilograms. The battery $a$ consists, for instance, of one hundred and eighty elements, while the battery $b$ has two hundred. The electrodes of the battery $a$ are constructed for discharges of one to two hours' duration. Those of the battery $b$ have, however, as already mentioned before, an extremely large surface and are formed strictly on the Planté system, so that they can easily give a high current discharge.

$c$ is a switch having six sets, each consisting of nine contact-plates, the sets being designated as I, II, III, IV, V, and VI, respectively. Any one of said sets may be brought in contact with nine contact-plates 1, 2, 3, 4, 5, 6, 7, 8, and 9. This can be done by placing the sets I to VI on a switchboard and securing the plates 1 to 9 to a movable switch-arm, or vice versa. The drawing shows the movable part of the switch removed from the stationary contact-pieces. The contact-pieces of the switch are connected in different manners in each set. Thus in set I the first contact-plate is connected to the fifth and seventh, the second, third, and fourth to the sixth, the eighth to the ninth, and the fifth remains unconnected. In set II the following contact-plates are connected: first to seventh, second to sixth, and eighth to ninth. The others are unconnected. In set III all the contact-plates are disconnected. In set IV the connections are as follows: third and fourth plates to sixth, fifth to seventh, and eighth to ninth, the first and second being unconnected. In set V the third plate is connected to the sixth, fifth to seventh, and eighth to ninth. The first, second, and fourth have no connection. In set VI the first plate is connected to the third, fourth, and seventh, the second to the eighth, and the sixth to the ninth, the fifth remaining without connection. The contact-plates 1 to 9 are connected as follows: plate 1 to the line, (for instance, by means of the trolley,) plate 2 to the ground or return conductor, plate 3 to one pole (the negative pole) of main battery $a$, plate 4 to the like (negative) pole of the auxiliary battery $b$, plate 5 to the other (positive) poles of both batteries, plate 6 to one terminal of the field-magnet coils of the motor $d$, plate 7 to one terminal (commutator-brush) of the armature-coil of the motor, plate 8 to the other terminal of the field-magnet coils, and plate 9 to the other terminal of the armature-coil. From these connections the path of the current in each position of the switch will be obvious.

When starting on a part of the course where there is no conductor, both batteries are put in circuit in parallel, as shown in the position IV, of the switch $c$, of which the cover is represented as removed. As soon as the normal velocity is attained the auxiliary battery $b$ is put out of circuit, so that only the battery $a$ remains working, as in position V. As the battery $b$ has a considerably higher tension than the battery $a$ the former will supply the entire amount of additional current required for starting, while the main battery is only under normal load. The auxiliary battery $b$ can again recover until the next start. When the vehicle enters the part of the line where there is an overground or underground conductor, the two batteries are to be put again in parallel into circuit, as in position I. The motor $d$ receives current from the conductor and the batteries $a$ and $b$ are charged parallel to the motor. The battery $b$ will be soon charged and its already high tension will be still augmented. When both batteries are charged, they are put out of circuit and the motor alone is connected to the conductor. (See position II.) Position III indicates the position of the switch during stoppages. VI is the position when the vehicle moves backward.

Having thus described my invention, I claim as new and desire to secure by Letters Patent—

1. The improvement for the working of vehicles with accumulator propulsion, in which the main battery, when starting, is put in circuit parallel with a small auxiliary battery constructed for quick discharge, for the purpose of supplying the additional current required, at the start, essentially from the auxiliary battery and thus avoiding a high rate of discharge from the main battery and augmenting its efficiency.

2. An electrically-propelled vehicle, provided with a motor, means for taking current from a conductor, two storage batteries of different capacity, and a switch whereby both batteries and the motor may be connected with the conductor in parallel, or the motor alone connected to the conductor, or the motor connected either with one storage battery only or with both, substantially as described.

3. An electrically-propelled vehicle, provided with a motor, means for taking current from a conductor, a main storage battery and an auxiliary storage battery of different capacity, and a switch whereby both batteries may be connected with the conductor, or the motor connected with the conductor, or the motor connected either with the main storage battery only or with both.

4. An electrically-propelled vehicle, provided with a motor, two storage batteries of different capacity, and a switch whereby both batteries, or only one of them, may be connected with the motor.

In testimony whereof I have signed this specification, this 15th day of October, 1897, in the presence of two subscribing witnesses.

FRIEDRICH WILHELM SCHNEIDER.

Witnesses:
FRANZ ZIMMERMANN,
FRANZ CONRAD.